United States Patent [19] [11] 3,762,039
Douglass et al. [45] Oct. 2, 1973

[54] PLASTIC ENCAPSULATION OF MICROCIRCUITS

[75] Inventors: Robert S. Douglass, Lansdale; C. Alan McDulin, Devon, both of Pa.

[73] Assignee: Mos Technology, Inc., Valley Forge, Pa.

[22] Filed: Sept. 10, 1971

[21] Appl. No.: 179,477

[52] U.S. Cl. .................. 29/588
[51] Int. Cl. .................. B01j 17/00, H01i 1/10
[58] Field of Search .................. 29/588, 627

[56] References Cited

UNITED STATES PATENTS

| | | | |
|---|---|---|---|
| 3,484,533 | 12/1969 | Kauffman | 29/627 UX |
| 3,693,252 | 9/1972 | Robertson et al. | 29/588 |
| 3,606,673 | 9/1971 | Overman | 29/588 |
| 3,627,901 | 12/1971 | Happ | 29/588 |
| 3,648,357 | 3/1972 | Green, Jr. | 29/588 |
| 3,544,857 | 12/1970 | Byrne et al. | 29/588 |

*Primary Examiner*—Milton S. Mehr
*Attorney*—Charles W. Bradley et al.

[57] ABSTRACT

Microcircuits are encapsulated in a hermetic plastic package by enclosing the ends of conductive leads in an open cavity arranged to house the microcircuit and defined by an inner casing, then positioning a microcircuit in the open cavity and electrically connecting the ends of the conductive leads to the microcircuit, thereafter, covering the open cavity and defining a closed cavity about the microcircuit, and then completely encapsulating the inner casing and adjacent portions of the conductive leads with an outer plastic molded casing.

11 Claims, 11 Drawing Figures

PLASTIC ENCAPSULATION OF MICROCIRCUITS

BACKGROUND OF THE INVENTION

1. Field of the Invention

This invention relates to plastic encapsulated microcircuits, and more particularly to a hermetic plastic package which encapsulates a microcircuit and a method of encapsulating a microcircuit in such package.

2. Description of the Prior Art

Because of more efficient yields in the making of microcircuits brought about by improved processing techniques, the cost of packaging or mounting a microcircuit or semiconductor chip for interconnection with an external circuit now constitutes a substantial portion of the overall costs of the manufacture of microcircuits. Of the various materials used in such packaging, such as ceramics, glass-metals, and plastics, plastic packaging is acknowledged in the art as offering a significant solution to the ever existing problem of reducing the overall costs of manufacturing microcircuits. Plastic packaging not only provides microcircuit manufacturers with flexibility since the same material can be used or molded in many packaging configurations, but also avoids the supply and logistic problems of ceramic parts as well as allows speedy and economical processing, such as by transfer molding - all in addition to the economy of the plastic material itself.

However, known plastic packages for microcircuits do not possess the reliability and assurance against failure in special environmental applications requiring hermeticity, and in these instances manufacturers are required to use more costly ceramic and glass-metal packaging.

The most widely utilized plastic package for a microcircuit consists of a semiconductor chip mounted on a lead frame and encapsulated in an electrically nonconductive, plastic compound. While this package construction is rugged and low in cost, it is subject to such failure mechanisms as surface contamination of the microcircuit, external leakage and corrosion, moisture penetration, and thermomechanical stresses resulting in breakage of interconnections between the microcircuit and the lead frame. Thus this plastic package can not be used in critical applications requiring hermeticity. Because the plastic is encapsulated directly on the microcircuit, impurities inherent or unavoidable in the plastic material may contaminate the surface of the microcircuit and cause failure; and moisture may penetrate into the package more easily and contaminate the microcircuit. The problems of surface contamination is probably of greatest concern in metal-oxide-semiconductor (MOS) microcircuits. In addition, because the plastic is applied directly over both the microcircuit and the connecting wires between the microcircuit and the lead frame, when this package is subject to thermal cycling, thermomechanical stresses are induced in the connecting wires, causing, in many instances, severing of the wires as the plastic expands and contracts.

In an attempt to avoid the failure problems brought about by moisture penetration, internal surface contamination, and thermomechanical stresses, another plastic package has been proposed which embodies an internal cavity which surrounds the microcircuit. In this package, a microcircuit is located, usually by gluing, in a cavity defined in the center top surface of a plastic base having thereon a film layer defining conductive leads extending to the center and near the microcircuit for electrical interconnection. A plastic lid is secured, sometimes with glue, on the plastic base to close the cavity. However, the sealing of the lid to the plastic base with glue detracts from the benefits provided by the closed cavity because such glues fail in many applications to provide reliable hermetic sealing.

SUMMARY OF THE INVENTION

It is an object of the present invention to provide a plastic package for microcircuits and method of encapsulating a microcircuit in such package which offer the economy of prior art plastic packages, and which, in addition, avoid substantially all the above discussed hermetic problems of prior plastic encapsulated microcircuits.

In acordance with the present invention, there is provided a plastic encapsulated microcircuit comprising an inner casing, preferably of molded plastic, defining an open cavity for housing a microcircuit, a cover associated with the inner casing for closing the open cavity and defining a closed cavity about the microcircuit, an outer molded plastic casing completely encapsulating the inner casing, and conductive leads of a lead frame extending through the outer and inner casings and electrically connected to the microcircuit. The closed cavity hermetically seals the microcircuit to substantially lessen failure caused by thermomechanical stressing, mositure penetration and internal surface effects and, because the outer package is defined by a completely encapsulating layer, the hermetic integrity of the package is not lessened by the use of glue and the like.

The microcircuit is encapsulated by first locating the ends of the conductive leads of a lead frame in an open cavity arranged to house the microcircuit by forming about the ends, an inner casing defining the open cavity, then positioning the microcircuit in the open cavity and electrically connecting the ends of the conductive leads to the microcircuit, covering the open cavity and defining a closed protective cavity about the microcircuit and then completely encapsulating the inner casing and adjacent portions of the conductive leads with an outer molded plastic casing.

The inner casing for housing the microcircuit is preferably made of silicone material because this material is found to provide a good barrier to moisture penetration, and the outer casing is preferably made of epoxy material because this latter material is rugged yet inexpensive. The open cavity defined by the inner casing is preferably open at the top to facilitate easy interconnection of the microcircuit and the lead frame ends and also open at the bottom to allow the attachment of the microcircuit to a support or paddle located in the cavity. The top and bottom openings of the cavity are each preferably closed with a metal lid which resists the mechanical stresses produced during the molding of the encapsulating or outer casing.

Various other objects, features and advantages of the invention will be apparent from the detailed description of the preferred embodiment thereof set forth hereinafter and shown in the accompanying drawings.

BRIEF DESCRIPTION OF THE DRAWINGS

FIG. 6 is a plan view showing the encapsulated microcircuit after the conductive leads are severed from the remaining portions of the lead frame, and when the leads are bent ninety degrees, is the same dual-in-line configuration shown in FIG. 1;

DESCRIPTION OF THE PREFERRED EMBODIMENT

Figure 1:
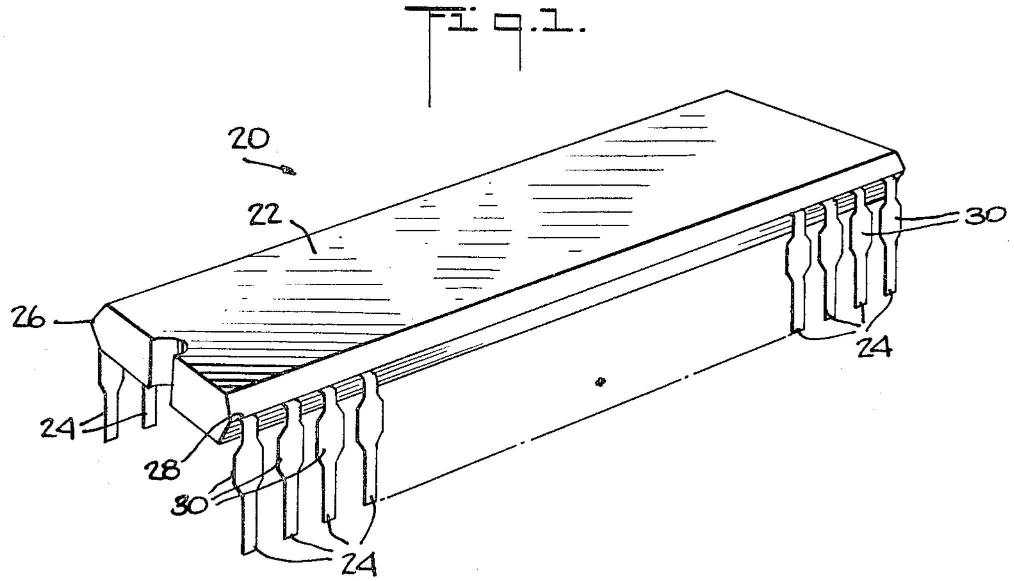
FIG. 1 is a schematic perspective view of a dual-in-line plastic encapsulated microcircuit constructed in accordance with the present invention.

While the package construction and method of the present invention can be utilized to realize many different packaging configurations, they will be described, for purposes of illustration, in connection with the making of the forty pin dual-in-line package 20 shown in FIG. 1.

The package 20 is comprised of a plastic body portion 22 in which a microcircuit (not shown) is encapsulated and a plurality of spaced apart external leads or pins 24 located adjacent the sides 26 and 28 of the body 22 and extending into the body 22 and electrically connected to the microcircuit encapsulated therein. The pins 24 have enlarged segments 30 which define a seating plane for the package 20 when connected to a dual-in-line socket (not shown).

Figure 7:
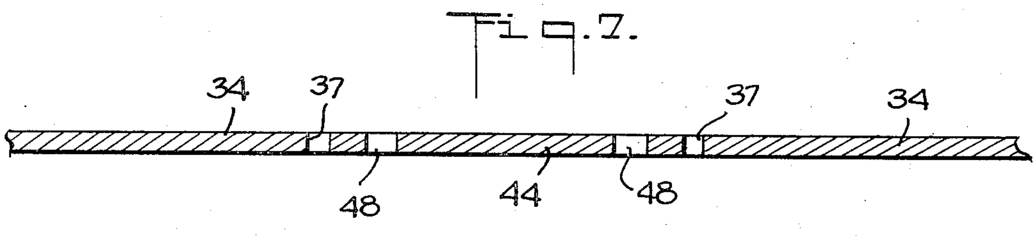
FIG. 7 is a vertical sectional view taken along line 7—7 of FIG. 2.
Figure 2:
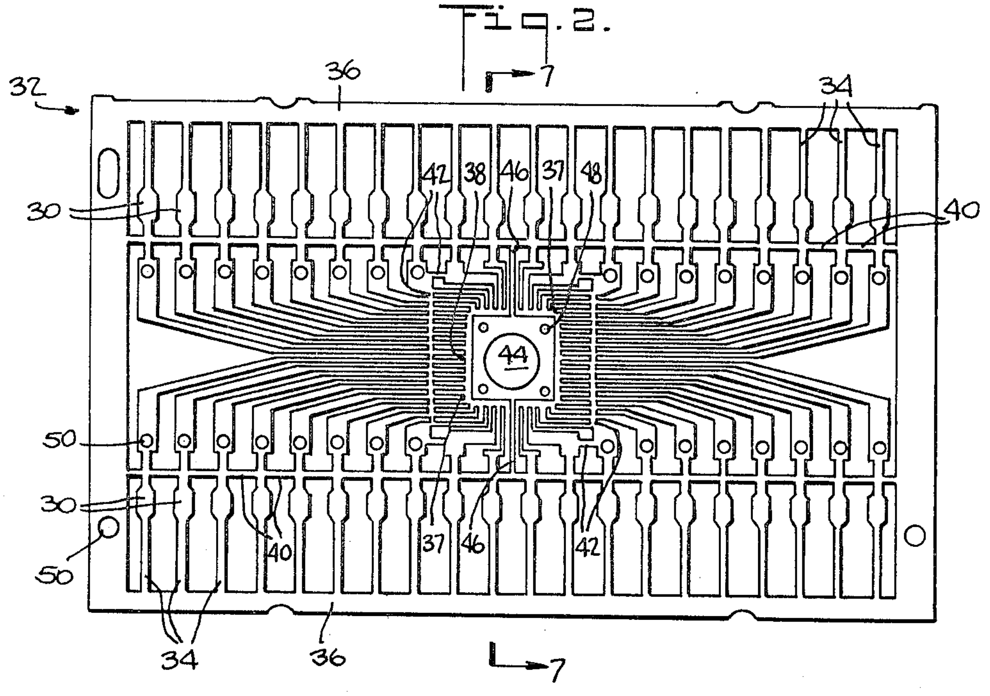
FIG. 2 is a plan view showing the lead frame utilized in the manufacture of the plastic encapsulated microcircuit shown in FIG. 1.

The plastic package 20 shown in FIG. 1, is fabricated using the cut out, preferably by etching, flat metal lead frame 32 shown in FIG. 2. The lead frame 32 has conductive strips, shown generally at 34, extending from a support member 36 defining the outer peripheries of the lead frame 32, and terminating with ends 37 in a center area shown generally at 38 in FIG. 2. Outer tie bars 40 are provided across the length of two sides of the lead frame 32 to interconnect and support the conductive strips 34 during the subsequent handling and molding steps described hereinafter. The area of the lead frame 32 enclosed by the outer tie bars 40 is covered by the body portion 22 of the package 20. The portions of the conductive strips 34 between the support member 36 and the outer tie bars 40 are sized and shaped to correspond to the external leads 24 of the package 20 (FIG. 1) and accordingly have enlarged segments 30. In addition, inner tie bars 42 are provided about the periphery of the center area 38 of the lead frame 32 to interconnect and support the portions of the conductive strips 34 in that area. A die attach paddle 44 is provided in the center area 38 of the lead frame 32, and is attached by supporting tie bars 46 interconnected to a tie bar 40 on each of the two sides of the lead frame 32. The paddle 44 is of sufficient size to define a base for supporting the microcircuit or semiconductor ship to be encapsulated. As best shown in FIG. 7, equalizing apertures 48 are provided through the flat surface of the paddle 44 to allow pressure equalization in the closed cavity defined about this member during molding procedures.

Indexing apertures 50 are provided in the support member 36 and in each of the conductive strips 34 adjacent the area where the strips are interconnected by the outer tie bars 40, to facilitate placing and holding the lead frame 32 in an transfer molding machine.

Figure 8:
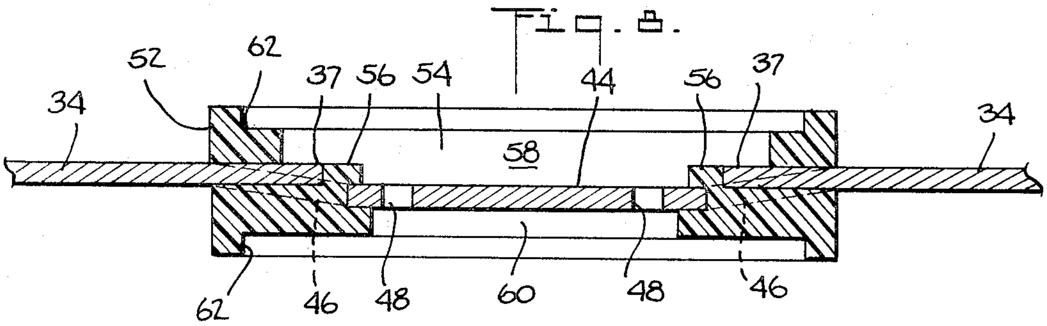
FIG. 8 is a vertical sectional view taken along line 8—8 of FIG. 3.
Figure 3:
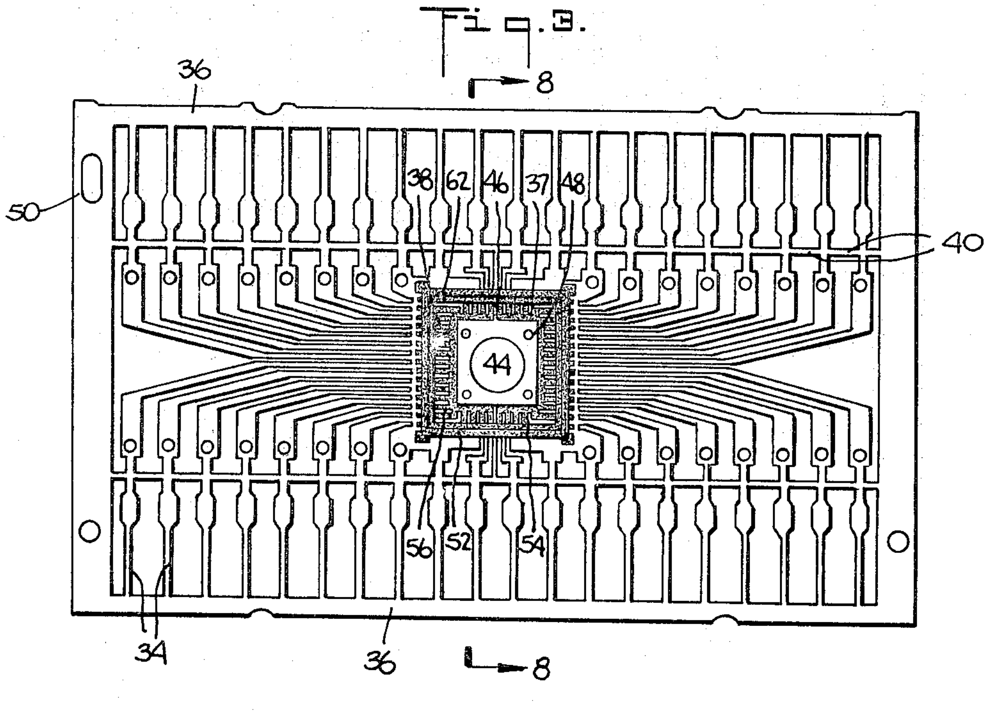
FIG. 3 is a plan view showing the inner casing of the plastic package of the present invention which defines an open cavity near the center portion of the lead frame shown in FIG. 2.

The lead frame 32 is first positioned in a transfer molding machine (not shown) and, as shown in FIGS. 3 and 8, a hollow inner casing 52, preferably of silicone material, is molded about the center area 38 to enclose the paddle 44 and the ends 37 of the conductive strips 34 in a cavity 54 which is open at the top and bottom.

As best shown in FIG. 8, the inner casing 52 fixes the ends 37 of the conductive strips 34 in a shelf 56 defined about the interior of the hollow inner casing 52 and fixes the support tie bars 46 and the outer edge of the paddle 44 in the wall of the inner casing, the paddle 44 being displaced downwardly with respect to the ends 37 during formation of the inner casing 52. The fixing of the ends 37 in the shelf 56 and the fixing of the paddle 44 rigidly to the wall of the inner casing 52 avoid the problem of supporting these elements by other means during subsequent attachment of the microcircuit to the paddle 44 and during the interconnection of the microcircuit with the ends 37 of the conductive strips 34.

Figure 4:
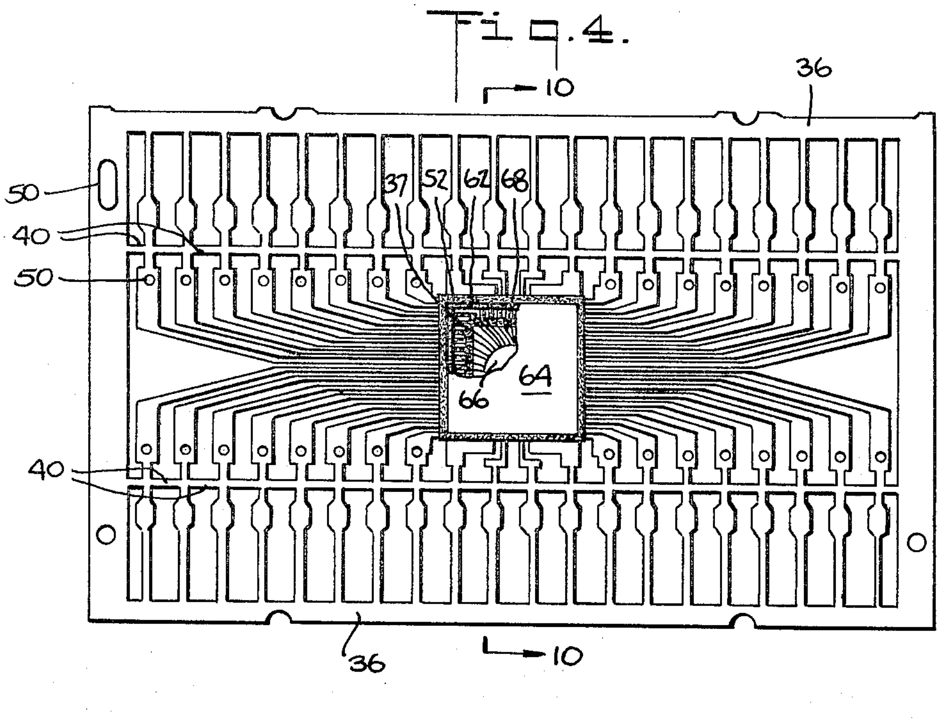
FIG. 4 is a plan view showing the cavity defined by the inner casing closed with lids to form an enclosed cavity about the microcircuit.
Figure 10:
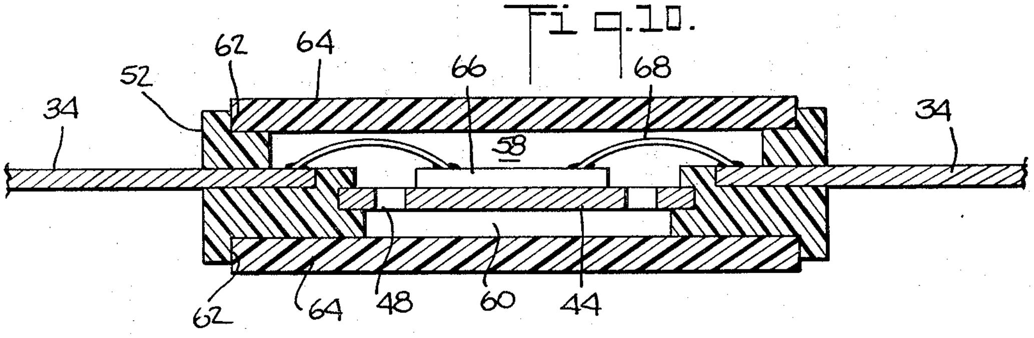
FIG. 10 is a vertical sectional view taken along line 10—10 of FIG. 4.

Referring still to FIG. 8, the inner casing 52 is sized to define a cavity area 58 above the paddle 44 sufficient to house the microcircuit and interconnecting wires and a cavity area 60 below the paddle 44 sufficient to protect the paddle and microcircuit during subsequent molding. An inwardly extending lip 62 is provided at both the top and bottom of the open inner casing 52 for defining seats for closure lids 64 (FIGS. 4 and 10).

The inner casing 52 is preferably formed in an transfer molding machine having one mold covering the top flat surface of the lead frame 32 at the center area 38 and defining a top portion of the inner casing 52, and another mold covering the bottom flat surface of the lead frame 32 at the center area 38 and defining a lower and remaining portion of the inner casing 52. With this molding arrangement, the inner tie bars 42 provided about the periphery of the center area 38 cooperate with the top and bottom molds and act as a dam to prevent spreading of the molding material outside the center area 38. These tie bars are advantageously positioned closer to the outer walls of the inner casing 52 than shown in FIG. 3, to provide better damming action, and preferably contiguous to the side walls to optimize this action, in which case the tie bars are just sufficiently exposed to permit their subsequent removal, as will be discussed.

After the inner casing 52 has been formed on the lead frame 32, the lead frame 32 is removed from the transfer molding machine and subjected to cleaning procedures preparatory to the attachment of the microcircuit to the paddle 44 and the interconnection of the ends 37 with the microcircuit. Specifically, the exposed portions of both the ends 37 and the paddle 44 are subjected to deflashing to remove residual film and material, and then are gold-plated to enhance their electrical conduction property. After these preparatory procedures, the inner tie bars 42 are removed from the lead frame 32, such as by a shearing, and the lead frame 32 is then positioned for attachment of the microcircuit.

Figure 9:
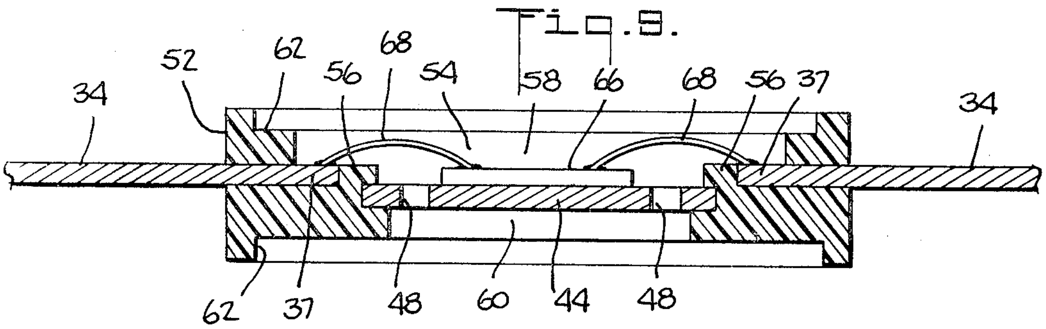
FIG. 9 is a vertical sectional view showing the interconnection of the microcircuit with the ends of conductive leads of the lead frame.

A microcircuit 66, such as a metal-oxide-semiconductive chip, is then located on the paddle 44 as shown in FIG. 9, and is preferably fixed thereto by a heated bonding means which extends through the bottom cavity area 60 to heat the bottom of the paddle 44 and forms an eutectic bond between the microcircuit 66 and the gold-plated paddle 44. After attachment, the microcircuit 66 is interconnected with the ends 37 of the conductive strips 34 by connecting wires 68. Preferably, the connecting wires 68 are attached to the ends 37 and to the microcircuit 66 by ultrasonic gold ball bonding since this technique avoids the application of excessive heat to the surface of the microcircuit 66.

After the microcircuit 66 is interconnected to the ends 37 of the conductive strips 34, closure lids 64 are seated, as shown in FIGS. 4 and 10, in the lips 62 defined at the top and bottom of the inner casing 52 to close the cavity 54 (and thus cavity areas 58 and 60) and thereby define a closed cavity about the microcircuit 66. The closure lids 64 are preferably of metal material, such as Kovar, an alloy of cobalt, nickel and iron, which provides good mechanical and environmental protection for the microcircuit 66. The closure lid 64 can be of a tight fit in the lip 62 or can be loose and glued on the lip 62 and to the inner casing 52. The use of glue to secure the closure of lid 64 does not affect the hermetic integrity of the package 20 since, as described hereinafter, an outer plastic layer is provided completely encapsulating the inner casing 52.

The closed cavity area 58 (FIG. 10) above the microcircuit 66 minimizes surface contamination problems since no compound or material contacts the microcircuit, prevents moisture penetration through the conductive strips 34 to the microcircuit 66, and obviates thermomechanical breakage of the connecting wires of 68 since these wires are allowed to move freely in the closed cavity. The closed cavity area 60 (FIG. 10) below the apertured paddle 44 defines an air gap between the bottom closure lid 64 and paddle 44 to protect the microcircuit 66 from movement and possible fracture during the molding of the outer encapsulating layer.

The cavity 54 may be closed by means other than closure lids 64, such as by filling the cavity 54 with a conformal coating which, when set, defines a roof over the cavity while still allowing some movement of the connecting wires 68 to avoid thermomechanical stresses. This latter method of closing the cavity 54 suffers from the drawback that contamination of the microcircuit is still possible because of the direct contact of the conformal coating with the microcircuit.

Figure 5:
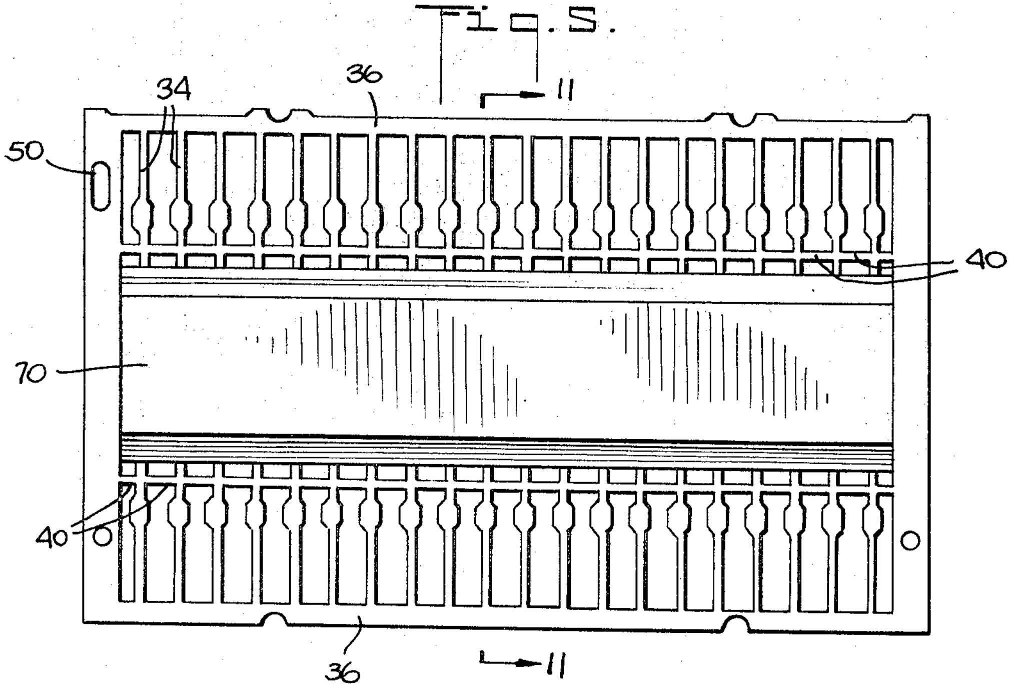
FIG. 5 is a plan view showing the outer molded plastic casing which encapsulates the inner casing and adjacent portions of the lead frame.
Figure 9:
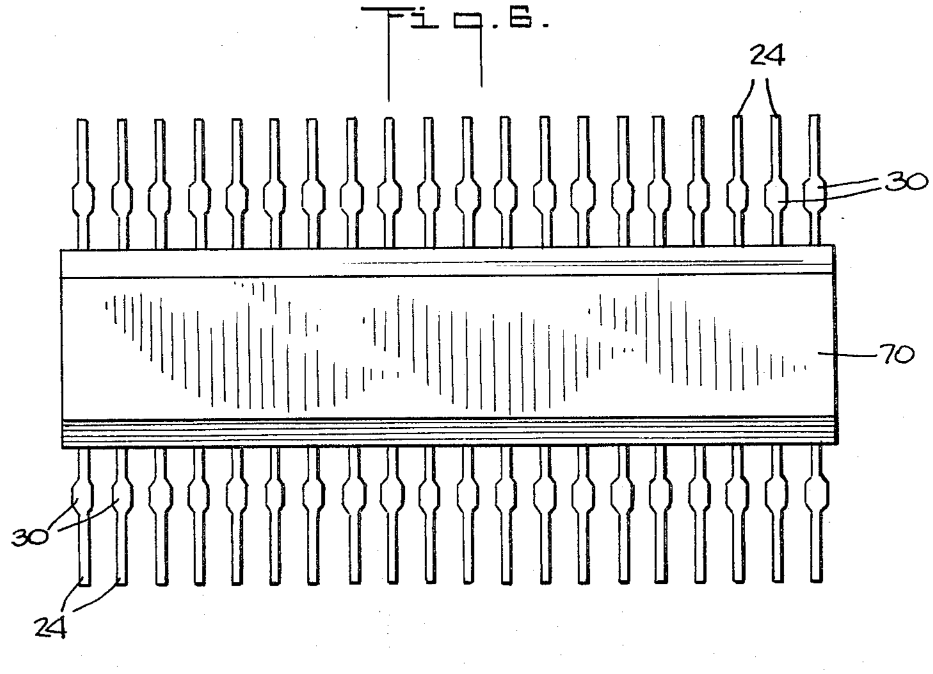
Figure 11:
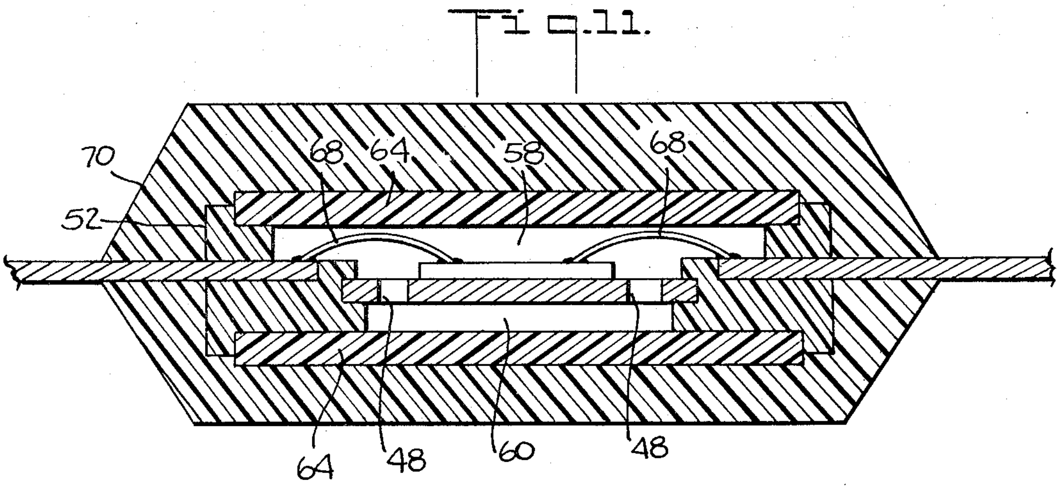
FIG. 11 is a vertical sectional view taken along line 11—11 of FIG. 5.

Referring to FIGS. 5 and 11, after the microcircuit 66 is enclosed in the closed cavity the lead frame 32 together with the inner casing 52 and closure lids 64 assembled thereon, are placed in another transfer molding machine (not shown) and an outer plastic casing 70, preferably of epoxy material, is molded between the area of the lead frame 32 enclosed by the outer tie bars 40 on the two sides of the lead frame to encapsulate the inner casing 52 and adjacent portions of the conductive strips 34.

The outer casing 70 which completely encapsulates the inner casing 52 is preferably formed in a transfer molding machine having one mold covering the top of the inner casing 52 and adjacent top portions of the lead frame 32 and defining the top portion of the outer casing 70, and another mold covering the bottom of the inner casing 52 and adjacent bottom portions of the lead frame 32 and defining the bottom portion of the outer casing 70. With this arrangement, the outer tie bars 40 cooperate with the top and bottom molds and act as a dam to prevent spreading of the molding material. As indicated in connection with the tie bars 42 and the inner casing 52, the outer tie bars 40 are advantageously positioned closer to the outer walls of the outer casing 70 as shown in FIG. 5, to provide better damming action and preferably contiguous to the side walls to optimize this action, in which case the tie bars are just sufficiently exposed to permit their subsequent removal, as will be discussed hereinafter.

After the molding of the outer casing 70, the lead frame carrying the thus encapsulated microcircuit 66, is removed from the transfer molding machine and the support member 36 and the outer tie bars 40 of the lead frame 32 are removed, preferably by shearing, to provide external leads 24 on the partly completed encapsulated structure shown in FIG. 6. Simultaneously with the removing of the outer tie bars 40, or as a subsequent step, the external leads 24 are bent to form the dual-in-line plastic encapsulated microcircuit package 20 shown in FIG. 1.

Thus, it will be appreciated that the plastic encapsulated microcircuit of the present invention avoids the failure problems of prior art plastic encapsulated microcircuits in that it embodies a cavity so that no plastic compound or other materials contact the microcircuit and interconnecting wires, that moisture penetration is avoided and that thermomechanical stresses are reduced. In addition, the problems of the hermetic integrity of other prior art plastic microcircuits are avoided by the use of an outer casing completely encapsulating the inner casing.

What is claimed is:

1. A method of encapsulating a microcircuit comprising obtaining a substantially flat metal lead frame having a paddle for supporting a microcircuit defined in its center portion, and conductive leads extending from a periphery portion of the lead frame and terminating at ends in said center portion adjacent said paddle, forming an inner casing about said center portion of said lead frame to define an open cavity housing said paddle and said ends of the conductive leads, fixing a microcircuit to said paddle and electrically connecting said microcircuit to said ends of the conductive leads, covering said open cavity and defining a closed cavity about said microcircuit, and then completely encapsulating said inner casing and adjacent portions of said lead frame with an outer molded plastic casing.

2. A method of encapsulating a microcircuit as in claim 1, wherein said inner casing is formed by displacing said paddle relative to said ends and molding plastic about said paddle and ends to fix and enclose said paddle and ends in said open cavity.

3. A method of encapsulating a microcircuit as in claim 1, wherein said inner casing is molded with silicone material.

4. A method of encapsulating a microcircuit as in claim 1, wherein said inner casing is defined by fixing said conductive leads and said paddle in the walls of a hollow body open at the top and bottom and defining said open cavity, and wherein said open cavity is covered by placing lids over the open top and bottom of said hollow body.

5. A method of encapsulating a microcircuit as in claim 1, wherein said microcircuit is fixed to said paddle by forming a eutectic bond between said paddle and said microcircuit.

6. A method of encapsulating a microcircuit as in claim 1, wherein said microcircuit and said ends of the conductive leads are electrically connected by interconnecting same with wiring attached by ultra-sonic bonding.

7. A method of encapsulating a microcircuit as in claim 1, wherein said paddle and said ends are gold plated prior to the fixing of the microcircuit on the paddle and electrically connecting the microcircuit to said ends.

8. A method of encapsulating a microcircuit as in claim 1, further including the step of removing said periphery portion of said lead frame after said inner casing is encapsulated with said outer molded plastic casing.

9. A method of encapsulating a microcircuit as in claim 8, further including the step of bending said conductive leads to form a socket-engagable encapsulated microcircuit.

10. A method of encapsulating a microcircuit as in claim 1, wherein said flat metal lead frame further includes inner tie bars supporting said conductive leads adjacent said center portion, wherein said inner casing is formed by molding plastic adjacent said inner tie bars, and further comprising the step of removing said inner tie bars prior to the encapsulation of said inner casing with the outer molded plastic casing.

11. A method of encapsulating a microcircuit as in claim 10, wherein said flat metal lead frame further includes outer tie bars supporting said conductive leads, wherein said outer molded plastic casing is formed by molding plastic about said inner casing up to said outer tie bars, and further comprising the step of removing said outer tie bars after the formation of said outer casing.

* * * * *